C. G. EDEN & A. E. CARTER.
MULTIPLE STRAND BUSH ROLLER CHAIN.
APPLICATION FILED MAR. 3, 1915.

1,170,431.

Patented Feb. 1, 1916.
2 SHEETS—SHEET 1.

Witnesses:
J. H. Langner.
V. Billetti.

Christopher Gabriel Eden and
Adrian Ethelbert Carter.
Inventors
by Lawrence Langner
Attorney C. G. EDEN & A. E. CARTER.
MULTIPLE STRAND BUSH ROLLER CHAIN.
APPLICATION FILED MAR. 3, 1915.

1,170,431. Patented Feb. 1, 1916.
2 SHEETS—SHEET 2.

Witnesses,
J. K. Langner.
V. Belletti.

Christopher Gabriel Eden and
Adrian Ethelbert Carter,
Inventors,
by Lawrence Langner
Attorneys.

UNITED STATES PATENT OFFICE.

CHRISTOPHER GABRIEL EDEN AND ADRIAN ETHELBERT CARTER, OF MANCHESTER, ENGLAND, ASSIGNORS TO HANS RENOLD LIMITED, OF MANCHESTER, ENGLAND.

MULTIPLE-STRAND BUSH-ROLLER CHAIN.

1,170,431.  Specification of Letters Patent.  Patented Feb. 1, 1916.

Application filed March 3, 1915. Serial No. 11,908.

*To all whom it may concern:*

Be it known that we, CHRISTOPHER GABRIEL EDEN and ADRIAN ETHELBERT CARTER, both subjects of the King of Great Britain, and residents of Manchester, in the county of Lancaster, England, have invented certain new and useful Improvements Relating to Multiple-Strand Bush-Roller Chains, of which the following is a specification.

This invention relates to driving chains of the type known as multiple-strand roller-chains. In such chains there is a plurality of rollers at each joint of the chain, while long studs are used each traversing the whole width of the chain and connecting the links of one section of the chain to those of the next section.

It is the object of the invention to provide an improved form of multiple-strand roller-chain which shall be easy to assemble and to take apart, and wherein the bearing surfaces shall be broad so that the intensity of stress or pressure on every bearing surface shall be kept relatively small, being distributed effectively along the length of the studs.

A further object is to provide a chain which can be made up of combinations of links, bushes and rollers already assembled to form inner combinations which are ready to be slipped on to the studs, additional link plates being employed if required in order to make the tensile strength of every section of the chain the same, or also to distribute the load more effectively along the studs.

These objects are attained and various advantages are secured by the construction of chains in the manner hereinafter fully set forth with reference to the accompanying drawings.

Figure 1:
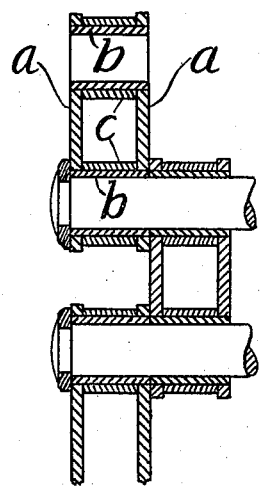
Figure 2:
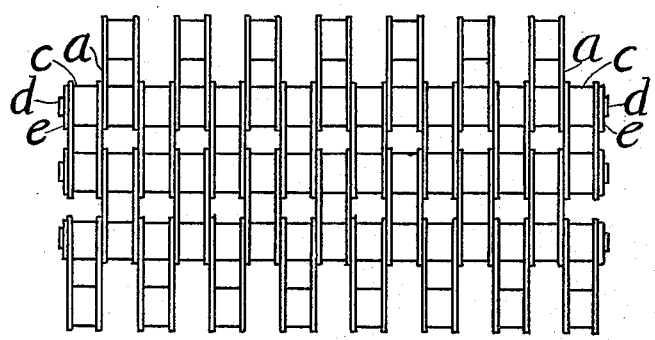
Figure 3:
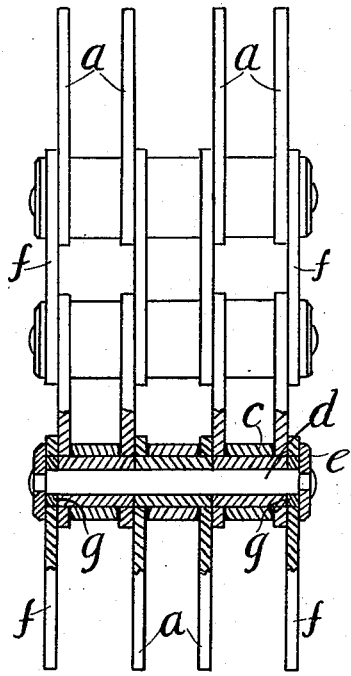
Figure 4:
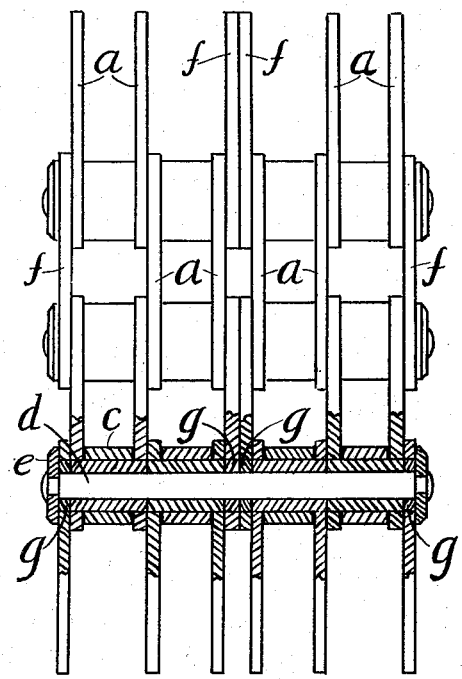
Figure 7:
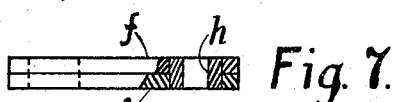
Figure 5:
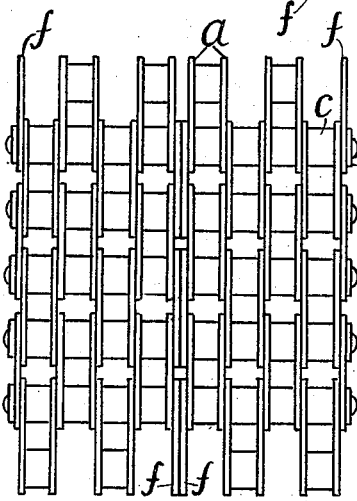
Figure 6:
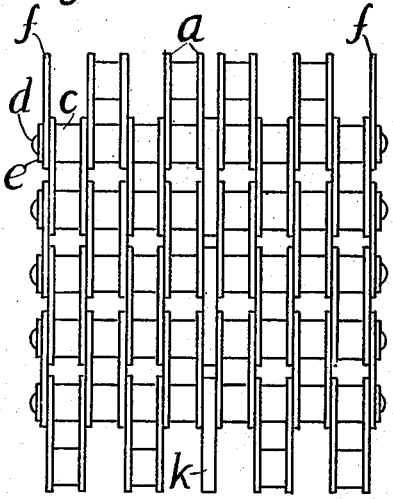

In the drawings: Figure 1 is a plan view, partly in section, showing a portion of a chain embodying the invention. Fig. 2 is a plan view of a chain drawn to a smaller scale, and showing a construction wherein alternate sections of the chain contain seven and eight inner combinations respectively. Fig. 3 is a view showing part of a chain partly in section, comprising inner combinations, and additional link plates at the outer ends only in alternate sections. Fig. 4 is a similar view to Fig. 3, showing a chain having two inner combinations in each section and additional link plates at the outer ends of one section and at the center line of the next section. Fig. 5 shows to a smaller scale a chain of the type illustrated in Fig. 4, but with four inner combinations in each section. Fig. 6 shows a slight modification of Fig. 5. Fig. 7 shows a detail view of a pair of links having at each end a single bush passed through both links.

Referring first to Fig. 1, the portion of the chain there shown, comprises parts of three successive sections; the sections are made up entirely of inner combinations each comprising a pair of link plates $a$, bushes $b$ forced into the ends of the link plates and uniting them, with rollers $c$ surrounding the bushes and free to turn thereon. The inner combinations are already made up, and are slipped on to studs $d$ when assembling the chain, being held thereon by riveting over the ends of the studs upon washers $e$. Any number of these inner combinations may be used in each section, according to the size and strength of chain required. For example, Fig. 2 shows a portion of a chain made up with seven inner combinations in one section and eight in the next, alternately throughout the length of the chain. The studs $d$ pass through the whole width of the chain at each joint. A chain made up in this way is very easy to assemble and to take apart, as the inner combinations are already assembled in the well known manner, and are all alike.

Fig. 3 shows a modified construction in which additional link plates $f$ are used, in order that there may be the same number of link plates in every section.

In Fig. 2 there are two more link plates in one section than in the next as will be apparent owing to the disparity between the numbers of inner combinations in said sections, but in Fig. 3, the added link plates $f$ at the ends of alternate sections render the construction more balanced, and the stresses in the link plates even throughout. The additional link plates are shown as having short bushes $g$ forced into them, so that all of the links bear by means of bushes on the studs $d$.

Fig. 4 shows a further modification wherein there are additional link plates $f$ in every section, those in one section being at the outer ends, while in the next section they lie side by side along the center line of the chain. In this case there are equal numbers both of inner combinations and of additional link plates in every section.

There may be any number of inner combinations in each section, and for example Fig. 5 shows a chain of the type illustrated in Fig. 4, but with four inner combinations in each section. The link plates $f$ at the center need not necessarily have separate bushes $g$, but as shown in Fig. 7, wherever the link plates $f$ lie in pairs side by side, they may be jointed at each end by a single bush $h$ forced through both link plates. Alternatively, as shown in Fig. 6, link plates $k$ of greater width, equivalent in strength to the pair of plates $f$ used at the center in Fig. 5, may be used.

The advantage of using a chain made up principally of inner combinations slipped on to the studs with the same number of combinations between each stud and the next, or with the number differing only by one combination in each section of the chain and the next, can best be seen by considering what the result would be if in one section of the chain inner combinations were provided, and in the next section there were only link plates connecting up to another set of inner combinations. In such a case the inner combinations would provide extended bearing surfaces on the studs, but the separate link plates in the adjacent sections of the chain would provide only narrow bearing surfaces on the studs. If relative rotation of the studs in these separate link plates were permitted the studs would become badly grooved or the link plates would be worn at the holes. If the studs were riveted to or were a force fit in the separate links, so that no relative rotation were permitted, the result would be that all the wear would take place in the ends of the inner combinations and the studs therein, and as the inner combinations would be only in alternate sections the result would be that alternate sections only would be lengthened by wear. Hence the gearing of such a chain with its chain wheels would be irregular. When however the chain is made up of inner combinations in every section thereof, and when no separate link plates are used, the intensity of pressure and the wear is distributed substantially evenly over the studs, although it is not quite even at the ends where the extra links extend in one section as compared with the next. When the additional link plates are put in so that the number of link plates in each section throughout the chain is the same, these link plates will take their share of the load, but they only share it with a number of inner combinations, so that there is no great disparity between the intensity of stress on the bearing surface of a separate link plate and that in the end of an inner combination. The studs or links therefore, are not worn away in an irregular manner to any appreciable extent, and the chain has a very long effective life. If the studs are riveted at their ends to washers as hereinbefore described, so that they are free to turn in the bushes of all of the inner combinations and of the link plates also, there is no one-sided wearing of the studs, and consequently at each bearing surface they are worn evenly around the whole circumference, which further increases the life of the chain as compared with constructions wherein the studs are riveted to or prevented from turning in one or other set of link plates.

Having thus described our invention, what we claim as new and desire to secure by Letters Patent is:—

1. A multiple-strand bush-roller chain, comprising inner chain combinations in every section of the chain, studs connecting together the inner chain combinations of adjacent sections, and means for securing the studs against slipping out while permitting independent rotation of the said studs, each inner chain combination consisting of a pair of link plates, bushes connecting together the pair of link plates at each end, and rollers surrounding the two bushes.

2. A multiple-strand bush-roller chain, comprising in each section of the chain a plurality of inner chain combinations, each of which chain combinations is similar in structure and consists of a pair of link plates, bushes connecting together the pair of link plates at each end, and rollers surrounding the bushes, studs connecting together the respective sections of the chain, and washers affixed on the ends of the studs.

3. A multiple-strand bush-roller chain, comprising inner chain combinations in every section of the chain, each inner chain combination consisting of a pair of link plates, bushes connecting together said link plates at each end, and rollers surrounding the two bushes, studs connecting together the inner chain combinations of adjacent sections, means for securing the studs against slipping out while permitting independent rotation of the said studs, additional link plates connecting the studs at the ends in alternate sections between the inner combinations, and at intermediate positions not less than the width of two inner combinations apart across the chain.

4. A multiple-strand bush-roller chain, comprising in alternate sections of the chain, inner chain combinations in the outermost positions, and additional link plates in the middle line of the chain, and in the intermediate sections inner chain combinations in the positions adjacent the middle line, and additional link plates at the outer ends of the sections, each inner chain combination consisting of a pair of link plates, bushes connecting together said link plates at each end, and rollers surrounding the two bushes, studs connecting the chain combinations and additional link plates of the respective sections, and means for preventing said studs from slipping out while permitting independent rotation thereof.

In witness whereof we have hereunto signed our names this 5th day of February, 1915, in the presence of two subscribing witnesses.

CHRISTOPHER GABRIEL EDEN.

Witnesses:
WILLIAM H. GLASER,
H. W. BLAKE.

ADRIAN ETHELBERT CARTER.

Witnesses:
MALCOLM SMETHURST,
ERNALD SIMPSON MOSELEY.

Copies of this patent may be obtained for five cents each, by addressing the "Commissioner of Patents, Washington, D. C."